(12) United States Patent
Shingai et al.

(10) Patent No.: US 8,391,646 B2
(45) Date of Patent: Mar. 5, 2013

(54) IMAGE PROCESSING DEVICE AND METHOD THAT PERFORMS IMAGE QUALITY ADJUSTMENT AND RESIZE PROCESSING ON IMAGE DATA

(75) Inventors: Kosuke Shingai, Matsumoto (JP); Nobutaka Sasazawa, Kagoshima (JP); Yukihito Takeshita, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 1223 days.

(21) Appl. No.: 12/201,431

(22) Filed: Aug. 29, 2008

(65) Prior Publication Data

US 2009/0060388 A1   Mar. 5, 2009

(30) Foreign Application Priority Data

Aug. 31, 2007   (JP) ................... 2007-226009

(51) Int. Cl.
   *G06K 9/32*    (2006.01)
(52) U.S. Cl. .................. 382/298; 382/299
(58) Field of Classification Search .......... 382/289
   See application file for complete search history.

(56) References Cited

U.S. PATENT DOCUMENTS

| | | | | |
|---|---|---|---|---|
| 6,178,272 B1* | 1/2001 | Segman | .......... | 382/298 |
| 6,631,206 B1* | 10/2003 | Cheng et al. | .......... | 382/164 |
| 7,456,867 B2* | 11/2008 | Yamada | .......... | 348/222.1 |
| 7,457,483 B2* | 11/2008 | Tokiwa | .......... | 382/298 |
| 7,460,157 B2* | 12/2008 | Yamada | .......... | 348/222.1 |
| 2002/0140693 A1* | 10/2002 | Nakami et al. | .......... | 345/418 |
| 2003/0044087 A1* | 3/2003 | Kondo et al. | .......... | 382/298 |
| 2005/0168775 A1* | 8/2005 | Liu | .......... | 358/1.15 |
| 2005/0226537 A1* | 10/2005 | Kondo et al. | .......... | 382/298 |
| 2006/0039630 A1* | 2/2006 | Kotani | .......... | 382/298 |
| 2006/0140477 A1* | 6/2006 | Kurumisawa et al. | .......... | 382/169 |
| 2007/0115503 A1* | 5/2007 | Nakami et al. | .......... | 358/1.16 |
| 2008/0056616 A1* | 3/2008 | Hasegawa | .......... | 382/298 |
| 2008/0062481 A1* | 3/2008 | Moriya et al. | .......... | 358/518 |
| 2008/0062484 A1* | 3/2008 | Moriya et al. | .......... | 358/534 |
| 2008/0063241 A1* | 3/2008 | Moriya et al. | .......... | 382/112 |
| 2009/0046173 A1* | 2/2009 | Yamada | .......... | 348/231.6 |
| 2009/0060388 A1* | 3/2009 | Shingai et al. | .......... | 382/298 |
| 2009/0245650 A1* | 10/2009 | Shingai | .......... | 382/195 |
| 2010/0182620 A1* | 7/2010 | Moriya et al. | .......... | 358/1.9 |
| 2011/0063675 A1* | 3/2011 | Moriya et al. | .......... | 358/1.15 |

FOREIGN PATENT DOCUMENTS

| | | |
|---|---|---|
| JP | 2001292308 A | 10/2001 |
| JP | 2002-344989 | 11/2002 |
| JP | 2004-186927 | 7/2004 |
| JP | 2006054576 A | 2/2006 |
| JP | 2006-178882 | 7/2006 |

* cited by examiner

*Primary Examiner* — Matthew Bella
*Assistant Examiner* — Gandhi Thirugnanam
(74) *Attorney, Agent, or Firm* — DLA Piper LLP (US)

(57) ABSTRACT

An image processing device, which performs, on image data, image quality adjustment processing and resize processing to adjust an image size to a target size, and which outputs processed image data, including: an adjustment parameter creation unit which creates adjustment parameters for the image quality adjustment processing, on the basis of original image data; a contrast information creation unit which acquires the image size of the original image data and the target size, and creates size contrast information; a resize amount detection unit which determines the resize amount in the resize processing on the basis of the size contrast information; and an adjustment parameter modification unit which modifies the adjustment parameters in accordance with the resize amount.

8 Claims, 12 Drawing Sheets

| Tag name | Parameter value |
|---|---|
| Exposure time | 1/137 second |
| Lens F value | F10.1 |
| Exposure correction amount | EV0.4 |
| Release F value | F2.0 |
| Lens focal length | 20.70(mm) |
| Color space information | sRGB |
| Photographic mode | 1 |
| Automatic adjustment level | 5 |

112 Additional information storage area

FIG. 7

| Mode | Contrast | Brightness | Color balance | Saturation | Sharpness | Stored color | Noise removal |
|---|---|---|---|---|---|---|---|
| 1 | standard | standard | standard | standard | standard | off | off |
| 2 | moderately soft | moderately bright | standard | moderately low | moderately weak | Yellowish beige | off |
| 3 | moderately hard | standard | standard | moderately high | moderately strong | Sky blue/green | off |
| 4 | standard | dark | off | standard | moderately weak | red | on |
| 5 | standard | dark | off | standard | standard | off | on |
| 6 | moderately soft | moderately bright | Weak | moderately high | standard | green | off |
| 7 | standard | standard | Weak | standard | strong | off | off |
| 8 | hard | bright | Standard | moderately high | strong | off | off |
| 9 | moderately soft | standard | Standard | standard | standard | off | off |
| 10 | standard | standard | Standard | high | moderately strong | red | off |
| 11 | standard | moderately bright | Standard | standard | moderately strong | Yellowish beige | off |

FIG. 8

| Image parameters | AP | MP | FP | FP' |
|---|---|---|---|---|
| Brightness | 16 | 10 | 26 | 42 |
| Sharpness | 5 | -10 | -5 | 0 |

FIG. 12

| Resolution | Pixel count | Square root α of size ratio | Size ratio β | Approximation y |
|---|---|---|---|---|
| QVGA | 320 × 240 | 0.16 | 0.0256 | 0.0558813953 |
| VGA | 640 × 480 | 0.32 | 0.1024 | 0.204255319 |
| SVGA | 800 × 600 | 0.4 | 0.16 | 0.3 |
| XGA | 1024 × 768 | 0.512 | 0.262144 | 0.444251627 |
| XGA+ | 1152 × 864 | 0.576 | 0.331776 | 0.527663425 |
| SXGA+ | 1400 × 1050 | 0.7 | 0.49 | 0.68372093 |
| UXGA | 1600 × 1200 | 0.8 | 0.64 | 0.8 |
| Base | 2000 × 1500 | 1 | 1 | 1 |
| QXGA | 2048 × 1536 | 1.024 | 1.048576 | 1.021022019 |
| QSXGA+ | 2800 × 2100 | 1.4 | 1.96 | 1.278260087 |
| QUXGA | 3200 × 2400 | 1.6 | 2.56 | 1.371428571 |
| HUXGA | 6400 × 4800 | 3.2 | 10.24 | 1.669565217 |
| 120M | 12800 × 9600 | 6.4 | 40.96 | 1.765517241 |
| 500M | 25600 × 19200 | 12.8 | 163.84 | 1.791253644 |

Too small

Adopted by embodiment

Too large

IMAGE PROCESSING DEVICE AND METHOD THAT PERFORMS IMAGE QUALITY ADJUSTMENT AND RESIZE PROCESSING ON IMAGE DATA

The entire disclosure of Japanese Patent Application No. 2007-226009, filed Aug. 31, 2007, is expressly incorporated by reference herein.

BACKGROUND

1. Technical Field

The present invention relates to an image processing device, an image processing method, and an image processing program and, in particular, to an image processing device, an image processing method, and an image processing program which perform, on image data, image quality adjustment processing and resize processing to adjust an image size to a target size, and which output processed image data.

2. Related Art

Conventionally, image quality adjustment processing that creates image quality adjustment parameters on the basis of image processing control information such as Exif (Exchangeable image file format) and PIM (Print Image Matching) information which are added to image data and on the basis of statistical values created by the sampling of image data and performs image quality adjustment on the image data in accordance with the image quality adjustment parameters is known (See JP-A-2002-344989, for example).

When image data are printed or displayed on a display, size adjustment (pixel number conversion) is executed in order to match the print size and display size. A device which executes such size adjustment and image quality adjustment processing preferably performs image quality adjustment on image data of a small data size either before or after size adjustment in order to improve the processing speed.

However, the image quality adjustment parameters created on the basis of the image processing control information and statistical information and so forth are created on the basis of original image data. Hence, when size adjustment is performed prior to image quality adjustment, various parameters with which the expected effects are not obtained are also present among image quality adjustment parameters which assume an original image.

SUMMARY

An advantage of the present invention is to provide an image processing device, an image processing method, and an image processing program which are capable of adapting to image quality adjustment of image data that have been changed, through resizing, to a different size from the original in cases where image quality adjustment parameters have been created assuming an application to original image data.

The image processing device of the present invention is an image processing device which performs, on original image data, image quality adjustment processing and resize processing to adjust an image size to a target size, and which outputs processed image data, and is constituted comprising an adjustment parameter creation unit, a contrast information creation unit, a resize amount detection unit, and an adjustment parameter modification unit.

In the above constitution, the adjustment parameter creation unit creates adjustment parameters for the image quality adjustment processing on the basis of the original image data. The original image data are image data constituting the processing target of the image processing device and may be input from outside the image processing device or stored within the image processing device. The adjustment parameters are created on the basis of image processing control information contained in additional higher-level information of the original image data and statistical values created by sampling the original image data, for example.

The contrast information creation unit acquires the image size of the original image data and the target size and creates size contrast information. The target size is the size of the image data output by the image processing device and is set in accordance with the output destination device. The output destination device is a print device or a display device, for example. The target size in the case of such devices is the print size or the display size of the display device or the like. The size contrast information is information representing the ratio in size between the image size and target size and can be represented by a pixel count conversion ratio, for example.

The resize amount detection unit determines the resize amount of the resize processing on the basis of there size contrast information. The resize amount is the original image enlargement ratio or reduction ratio and can be represented by the percentage of the image size with respect to the target size or the percentage of the pixel count of the image size with respect to the percentage of the pixel count required for the target size with respect to the pixel count of the image size (the percentage for each variable of the coordinate system adopted) or the like.

The adjustment parameter modification unit modifies the adjustment parameters in accordance with the resize amount so that the results of adjusting the original image data using the adjustment parameters are suitably maintained for there sized image data. As a result of modifying the adjustment parameters, the adjustment intensity is modified in accordance with the resize amount and adjustment parameters with which suitable adjustment results are obtained for the resized image data are created.

Furthermore, as one selective aspect of the present invention, the adjustment parameter modification unit is constituted to modify the adjustment parameters in accordance with the resize amount so that the difference between the adjustment effect for the original image data of the adjustment parameters and the adjustment effect for the resized image data is small.

That is, in this parameter modification, the parameters are modified so that the adjustment results for the original image data using the adjustment parameters are suitably maintained for the resized image data. The modification of the adjustment parameters to minimize the difference in the adjustment results corrects the adjustment parameters so that there is a substantial match between the adjustment result of the image quality adjustment processing performed on the original image data by using the adjustment parameters and the adjustment results in cases where the image quality adjustment processing is carried out on the resized image data. When adjustment parameters are corrected, image quality adjustment processing with which adjustment results are suitably demonstrated is possible even in cases where image quality adjustment processing is performed on resized image data.

Furthermore, as one selective aspect of the present invention, the image quality adjustment processing is constituted to be performed on image data of a small size either prior to or after the resize processing. That is, in cases where the resize processing is reduction processing, image quality adjustment processing is executed on image data after resizing processing and the processing amount of the image quality adjustment processing can be reduced in comparison with cases where image quality adjustment processing is performed on pre-resizing image data. However, in cases where the resize processing is enlargement processing, because the data amount of the resized image data increases, an increase in the processing amount can be suppressed by executing image quality adjustment processing on pre-resizing image data of a small data amount.

Furthermore, as one selective aspect of the present invention, in cases where the image size in the size contrast information is equal to or greater than the target size, the adjustment parameter modification unit modifies the adjustment parameters and the image quality adjustment processing is performed on image data that has been resized in the resizing processing and, in cases where the image size in the size contrast information is smaller than the target size, the adjustment parameter modification unit does not modify the adjustment parameters and the resize processing is executed for image data that have been quality-adjusted by the image quality adjustment processing. That is, in cases where the resize processing is reduction processing, adjustment parameter modification processing is performed and, in cases where the resize processing is not reduction processing, adjustment parameter modification processing is not performed.

In addition, as one selective aspect of the present invention, the image quality adjustment processing is image quality adjustment for convolution of the influence of peripheral pixels, which are contained in a predetermined range centered on pixels of interest, with the convolution being applied to the pixels of interest. That is, image quality adjustment processing in which adjustment parameters are readily affected by image resizing includes processing for convolution of the influence of peripheral pixels, which are contained in a predetermined range centered on pixels of interest, with the convolution being applied to the pixels of interest. When resizing is performed, the adjustment results of the image quality adjustment processing are not maintained because an area which differs from the range assumed as the predetermined range for the original image data is designated as the predetermined range. Suitable processing results are obtained by applying the present invention to such image quality adjustment processing. Sharpness adjustment, blur processing and noise removal processing exemplify image quality adjustment that performs convolution calculations.

Further, as one selective aspect of the present invention, the adjustment parameter modification unit is constituted to perform adjustment intensity modification of the adjustment parameters by modifying the amount of influence of the peripheral pixels on the pixels of interest. That is, the adjustment parameter modification unit creates adjustment parameters capable of maintaining the adjustment results without modifying the predetermined range by modifying the amount of influence of the peripheral pixels on the pixels of interest. More specifically, in cases where image quality adjustment processing that performs the convolution by means of a pre-prepared convolution mask is executed, the adjustment parameter modification unit corrects the adjustment parameters by modifying the weight coefficient without modifying the mask size. Accordingly, a program which deals with mask size modification is unnecessary and the program size can be reduced.

In addition, as one selective aspect of the present invention, the adjustment parameter modification unit is constituted to perform adjustment intensity modification of the adjustment parameters by modifying the predetermined range of the range of the peripheral pixels for convolution with the pixels of interest. That is, an appropriate range corresponding with the range assumed as the predetermined range for the original image data can be set as the convolution range by adjusting the convolution range to correspond with the size modification.

Furthermore, as one selective aspect of the present invention, the image quality adjustment processing is constituted as at least one of sharpness adjustment processing, blur processing, and noise removal processing. In other words, sharpness adjustment, blur processing, and noise removal processing exemplify image quality adjustment that performs convolution calculations.

The present invention includes various aspects where the image processing device is implemented in a state where same is built into another device or implemented together with another method, or the like. Furthermore, the present invention can also be implemented as an image processing system comprising the image processing device, a method with steps corresponding to the constitution of the device above, a program that causes a computer to implement functions corresponding to the constitution of the device above, and a computer-readable recording medium on which the program is recorded. Inventions of the image processing system, image processing method, image processing program, and medium on which the program is recorded also exhibit the above mentioned actions and effects. The constitutions mentioned in claims 2 to 9 can also be applied to the system, the method, the program and the recording medium.

BRIEF DESCRIPTION OF THE DRAWINGS

FIG. 7 is an explanatory diagram showing an example of combinations of photographic modes, image quality parameters, and numerical values designating the photographic modes;

FIG. 8 is an explanatory diagram showing illustrative values for the respective parameters AP, MP, FP, and FP' for brightness and sharpness;

FIG. 12 is a graph of the results for the sharpness adjustment value correction calculation.

DESCRIPTION OF EXEMPLARY EMBODIMENTS

A. Constitution Of Image Processing Device

Figure 1:
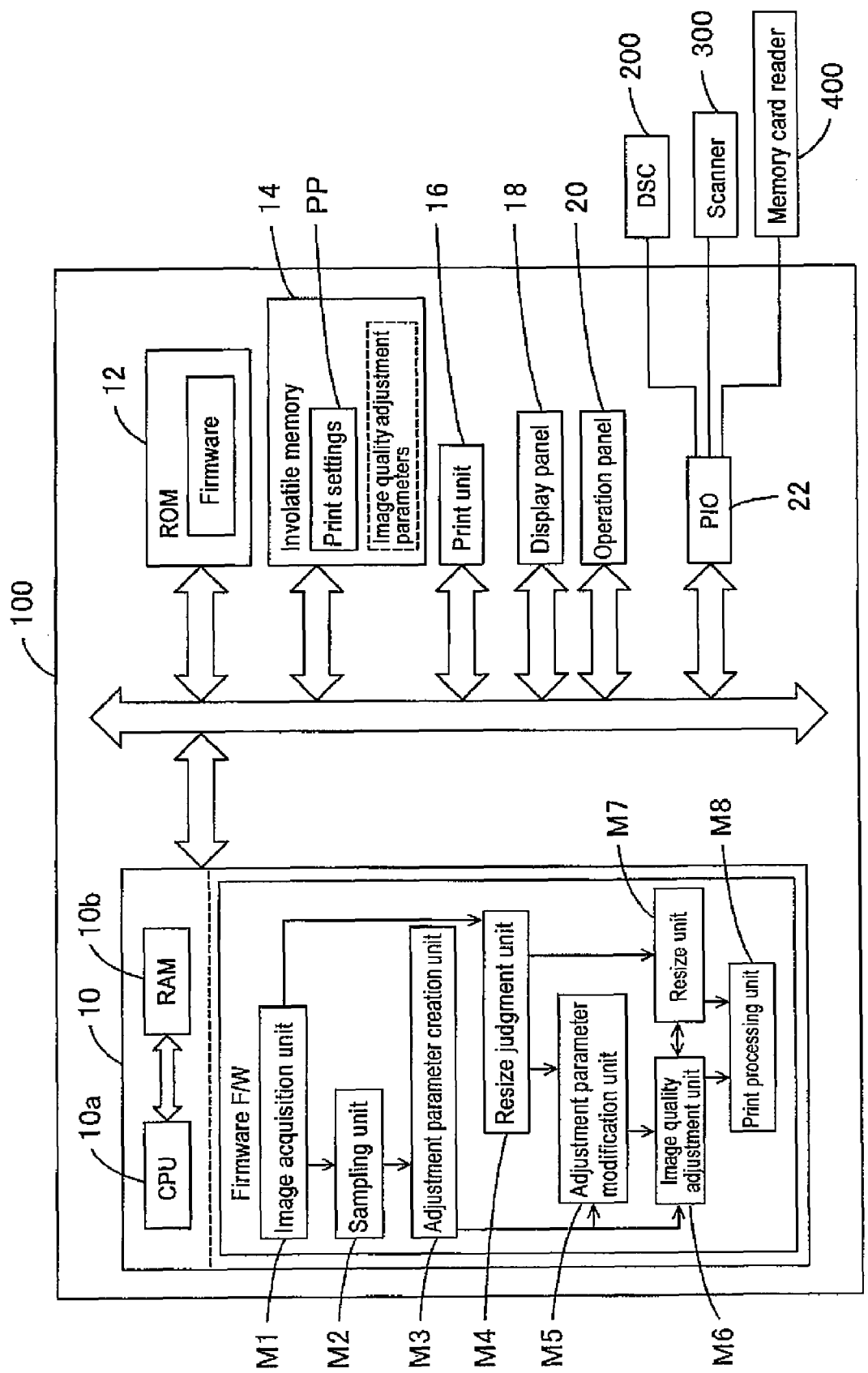
FIG. 1 is a block diagram showing the schematic constitution of an image processing device and peripheral devices thereof.

FIG. 1 shows, by means of a block diagram, the schematic constitution of an image processing device according to an embodiment of the present invention, as well as peripheral devices thereof. In FIG. 1, a printer is shown as the image processing device that fulfils the core function of the image processing. Suitably connected to a peripheral device I/O unit (PIO) 22 of the printer are a scanner, a digital still camera (DSC) and a memory card reader, or the like, which are various image input devices. Furthermore, a printer 100 comprises a print unit 16 and a display panel 18 and so forth which are image output units and is capable of image printing and print previews.

A control unit 10 of the printer 100 executes various programs which are stored in a predetermined storage medium such as a ROM 12 and an involatile memory 14 while a CPU 10a uses a RAM 10b as a work area. In this embodiment, the control unit 10 reads and executes firmware (F/W) that is stored in the ROM 12. The executed F/W generally comprises an image acquisition unit M1, a sampling unit M2, an adjustment parameter creation unit M3, a resize judgment unit M4, an adjustment parameter modification unit M5, an image quality adjustment unit M6, a resize unit M7, and a print processing unit M8.

The image acquisition unit M1 acquires image files that are input by an image input device and image files that are stored in the involatile memory 14 as input images, performs input image decoding and color space conversion as necessary, and outputs image data GD and additional information.

The sampling unit M2 extracts (samples) additional information from the image data GD output by the image acquisition unit M1 and extracts (samples) pixels of predetermined numbers (pixel groups). Additional information is, for example, information designating image processing conditions of the image file GF, such as, for example, parameters for sharpness, blur, and noise removal, and so forth. A pixel group denotes pixels corresponding to a predetermined condition among the pixels constituting the pixel data GD. In this embodiment, pixels of pixel data GD are extracted at predetermined intervals and image data Smp compressed to a predetermined percentage is extracted as a pixel group.

The adjustment parameter creation unit M3 uses the information extracted by the sampling unit M2 to create image quality adjustment parameters for the image data GD. For example, image processing control information in the additional information output by the sampling unit M2 is used and parameters for sharpness, blur, and noise removal and so forth set in the image processing control information are made the image quality adjustment parameters. In addition, image data Smp is used to create an average value for the histogram and brightness of the pixel group, an adjustment target value is acquired, and image quality adjustment parameters for adjusting the image data GD are created. The adjustment target value is an ideal value for the average value of the histogram and brightness and is pre-stored in a predetermined storage medium such as the involatile memory 14 or input from the outside. The adjustment parameter creation unit M3 utilizes parameters created from the image processing control information and image data Smp to create the image quality adjustment parameters.

The resize judgment unit M4 compares the image size of the input image data and output size of the output device and, as a result of the comparison, judges whether resizing of the image data GD is required when the data is output. For a reduction in the processing (speed increase), image data adjustment based on the image quality adjustment parameters is preferably carried out on image data with a smaller pixel count either prior to or after size adjustment. In this embodiment, the resize judgment unit judges whether either the processing of the resize unit M7 or the processing of the image quality adjustment unit M6 is executed first. In cases where the processing of the resize unit M7 is performed first, the adjustment parameter modification unit M5 is executed prior to the image quality adjustment of the image quality adjustment unit M6.

The adjustment parameter modification unit MS corrects the image quality adjustment parameters created by the adjustment parameter creation unit M3 on the basis of the judgment result of the resize judgment unit M4. This is because, in cases where the image quality adjustment parameters created with the object of adjusting the image data GD are utilized to perform image quality adjustment of the resized image data GD', correction of the image quality adjustment parameters is required in order to obtain the same correction result. However, in cases where the image is enlarged by the resizing, because an increase in the processing speed when performing the resizing after performing image quality adjustment on the original image is anticipated, there is no need to correct the image quality adjustment parameters. Hence, in this embodiment, in cases where it is judged by the resize judgment unit M4 that an image reduction is required, the adjustment parameter modification unit M5 corrects the image quality adjustment parameters to conform to the resized image data GD'.

The image quality adjustment unit M6 performs image quality adjustment on the image data in pixel units on the basis of the image quality adjustment parameters created by the adjustment parameter creation unit M3 or the image quality adjustment parameters corrected by the adjustment parameter modification unit M5. Naturally, image quality adjustment may also be performed in block units by taking a plurality of pixels as a unit block.

The resize unit M7 performs size adjustment of the image data GD in accordance with the judgment of the resize judgment unit M4 and converts the original image size to the pixel count (target size) suited to the print size of the print medium or the display size of the display unit. In other words, size adjustment is carried out by performing thinning processing or interpolation processing by taking the pixel count constituting the print data estimated from the print size and the display pixel count as targets.

The print processing unit M8 executes processing to acquire image data GD", which has undergone image quality adjustment and resizing, and execute printing based on the image data GD". More specifically, the print processing unit M8 performs processing to control the print unit 16 on the basis of the print conditions accompanying the image data GD", to sequentially execute layout processing/rendering processing/color conversion processing/halftone processing/microweb processing on the basis of the main body of the image data and output a drive signal that corresponds with the print image to the print unit 16.

B. Constitution Of Image File

Figure 2:
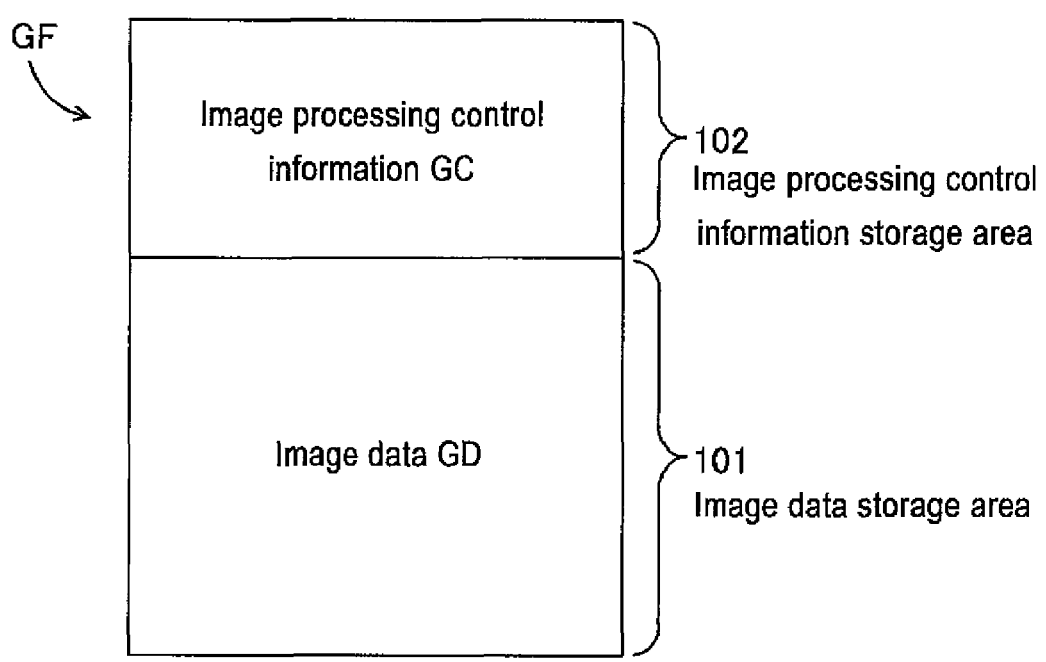
FIG. 2 shows the schematic constitution of an image file.

The schematic constitution of an image file that can be used in this embodiment will now be described with reference to FIG. 2. FIG. 2 is an explanatory diagram that conceptually shows an example of the internal constitution of the image file that can be used in this embodiment. The image file GF comprises an image data storage area 101 that stores image data GD and an image processing control information storage area 102 that stores image processing control information (image quality adjustment processing conditions) GC that is referenced and applied during automatic image quality adjustment of the image data.

The image data GD is stored in the JPEG format, for example, and the image processing control information GC is stored in the TIFF format. Terms such as the file structure, data structure, and storage area in this embodiment signify file or data images in a state where files or data or the like are stored in the storage device.

The image processing control information GC is information designating image processing conditions when image-processing image data generated by an image data generation device such as the DSC 12 and can include parameters relating to the exposure time, ISO sensitivity, aperture, shutter speed, and focal length that can be optionally set by the user, as well as image processing control parameters such as an exposure correction amount, white balance, photographic mode, target color space, contrast designation, saturation adjustment amount designation, sharpness designation, and noise removal designation, which are optionally set by the user. Alternatively, in cases where the photographic mode is designated by the user, a combination of image processing control parameters which are related to the designated photographic mode can be included as the image processing control information GC automatically in accordance with the photography.

The image file GF according to this embodiment can also be generated by an input device (image file generation device) such as a digital video camera (DVC) or scanner, in addition to the DSC 12. In cases where the image file GF is generated by a DVC, an image file which stores still image data and output control information or a moving image file which contains moving image data in the MPEG format and output control information is generated, for example. In cases where the moving image file is used, output control corresponding with output control information is executed for all or some of the frames of the moving image is executed.

The image file GF according to this embodiment may basically comprise the image data storage area 101 and the image processing control information storage area 102 mentioned earlier and a file structure corresponding to an already standardized file format can be adopted. A case where the image file GF according to this embodiment conforms to a standardized file format will be specifically described hereinbelow.

Figure 3:
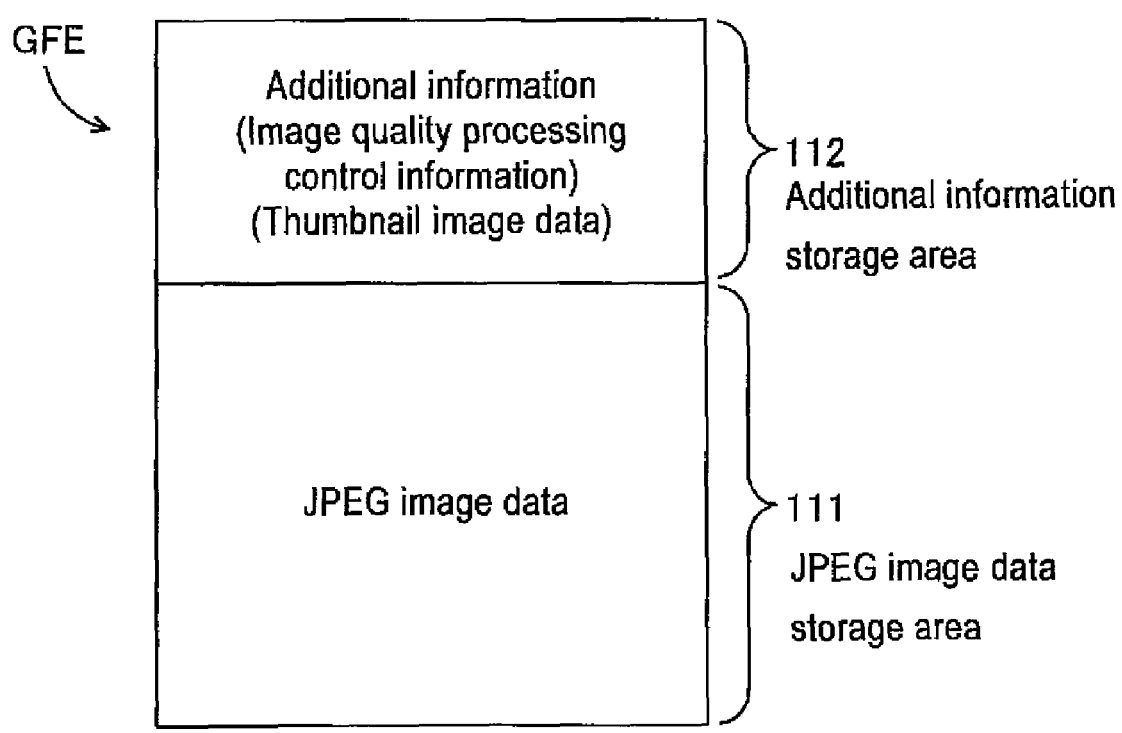
FIG. 3 is an explanatory diagram showing a schematic internal constitution of an image file stored using the Exif file format.

The image file GF according to this embodiment can have a file structure conforming to the DSC image file format standard (Exif), for example. The specifications of the Exif file are defined by the Japan Electronics and Information Technology Industries Association (JEITA). The schematic structure within the file in a case where the image file GF according to this embodiment has a file format conforming to the Exif file format will be described with reference to FIG. 3. FIG. 3 is an explanatory diagram showing the schematic internal structure of an image file GF according to this embodiment that is stored in the Exif file format.

The image file GFE constituting an Exif file comprises a JPEG image data storage area 111 that stores JPEG-format image data and an additional information storage area 112 that stores various information relating to the stored JPEG image data. The JPEG image data storage area 111 corresponds to the image data storage area 101 and the additional information storage area 112 corresponds to the image processing control information storage area 102.

The additional information storage area 112 stores image processing control information GC (image quality adjustment processing conditions) that is referenced when outputting a JPEG image such as the photography date and time, the exposure, the shutter speed, the white balance, the exposure correction amount, the target color space, the flash usage, the contrast designation, the saturation adjustment amount designation, the sharpness designation, and the noise removal designation. Furthermore, the additional information storage area 112 stores thumbnail image data for the JPEG image stored in the JPEG image data storage area 111 in the TIFF format in addition to the image processing control information GC. As is well known by a person skilled in the art, an Exif format file uses a tag to specify each of the data and each of the data are sometimes called by means of a tag name.

Figure 4:
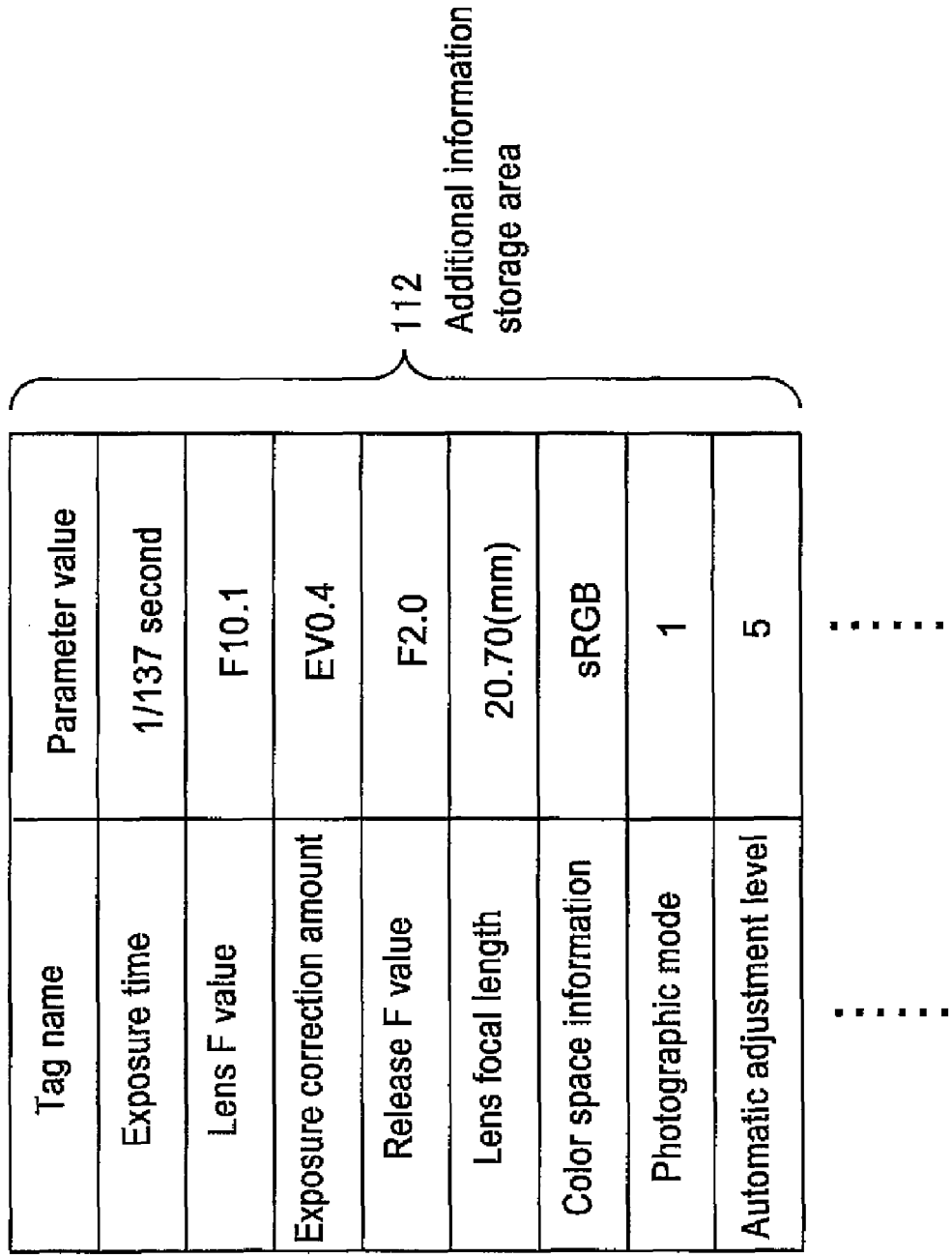
FIG. 4 is an explanatory diagram showing an example of the data structure of an image file additional information storage area.

The detailed data structure of the additional information storage area 112 will be described with reference to FIG. 4. FIG. 4 is an explanatory diagram showing an example of the data structure of the additional information storage area 112 of the image file GF that can be used in this embodiment.

The additional information storage area 112 stores parameter values for the image processing control information GC such as the exposure time, lens F value, exposure control mode, ISO sensitivity, exposure correction value, white balance, flash, focal length, and photographic mode as shown in FIG. 4 in accordance with an existing address or offset value. The image processing control information GC can be acquired on the output device side by designating the address or offset value corresponding with the desired information (parameters). The image processing control information GC may also be stored in a user definition area liberated by the user which is an undefined area within the additional information storage area 112.

C. Image Processing

Figure 5:
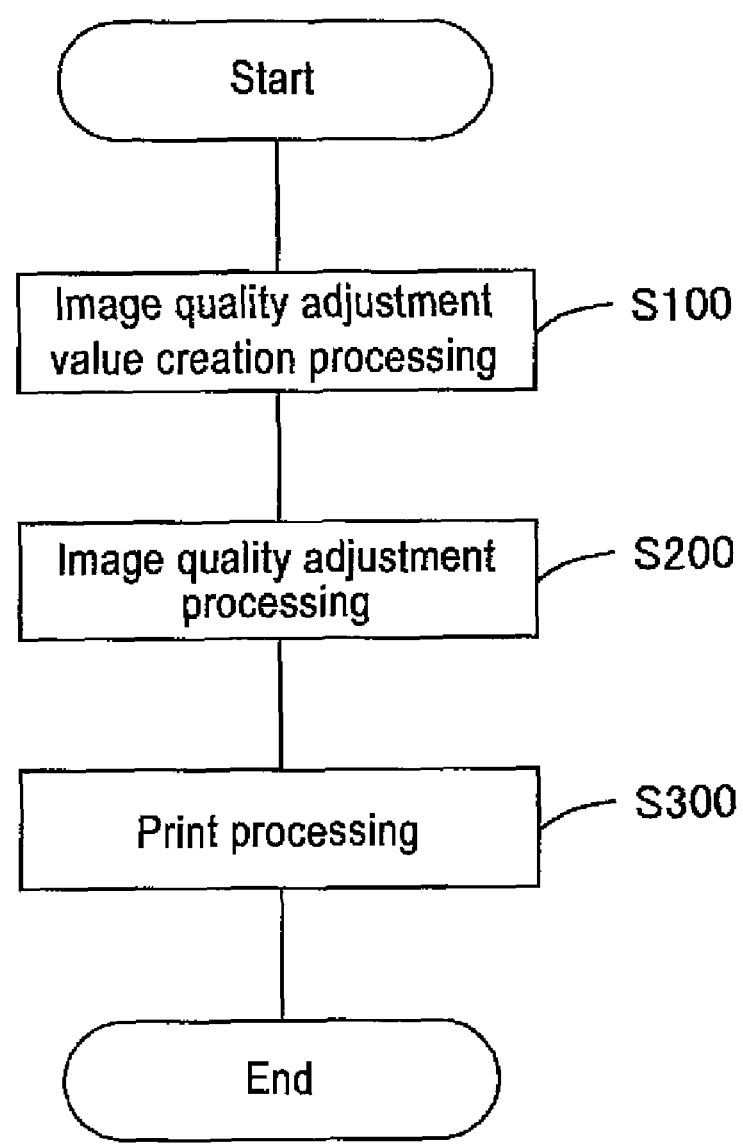
FIG. 5 is a flowchart for image processing.

The image processing of this embodiment comprises, as shown in FIG. 5, image quality adjustment parameter creation processing S100 that is executed by the image acquisition unit M1, the sampling unit M2, and the adjustment parameter creation unit M3, image quality adjustment processing S200 that is executed by the image acquisition unit M1, the resize judgment unit M4, the adjustment parameter modification unit M5, the image quality adjustment unit M6, and the resize unit M7, and the print processing S300 that is executed by the print processing unit M8.

In the image quality adjustment parameter creation processing S100, processing to create image quality adjustment parameters for the image data GD is performed. Therefore, the image quality adjustment parameter creation processing S100 is processing to create image quality adjustment parameters which can be universally used for the image data GD irrespective of the content of print processing or the content of display processing which are subsequently executed. The image quality adjustment parameters created by the image quality adjustment parameter creation processing S100 may also be stored in an involatile memory 14 which is associated with the image file GF and, in cases where an already processed image file GF is input once again, the image quality adjustment parameter creation processing is not executed and image quality adjustment processing may be executed by utilizing the stored image quality adjustment parameters.

D-a. Image Quality Adjustment Parameter Creation Processing

Figure 6:
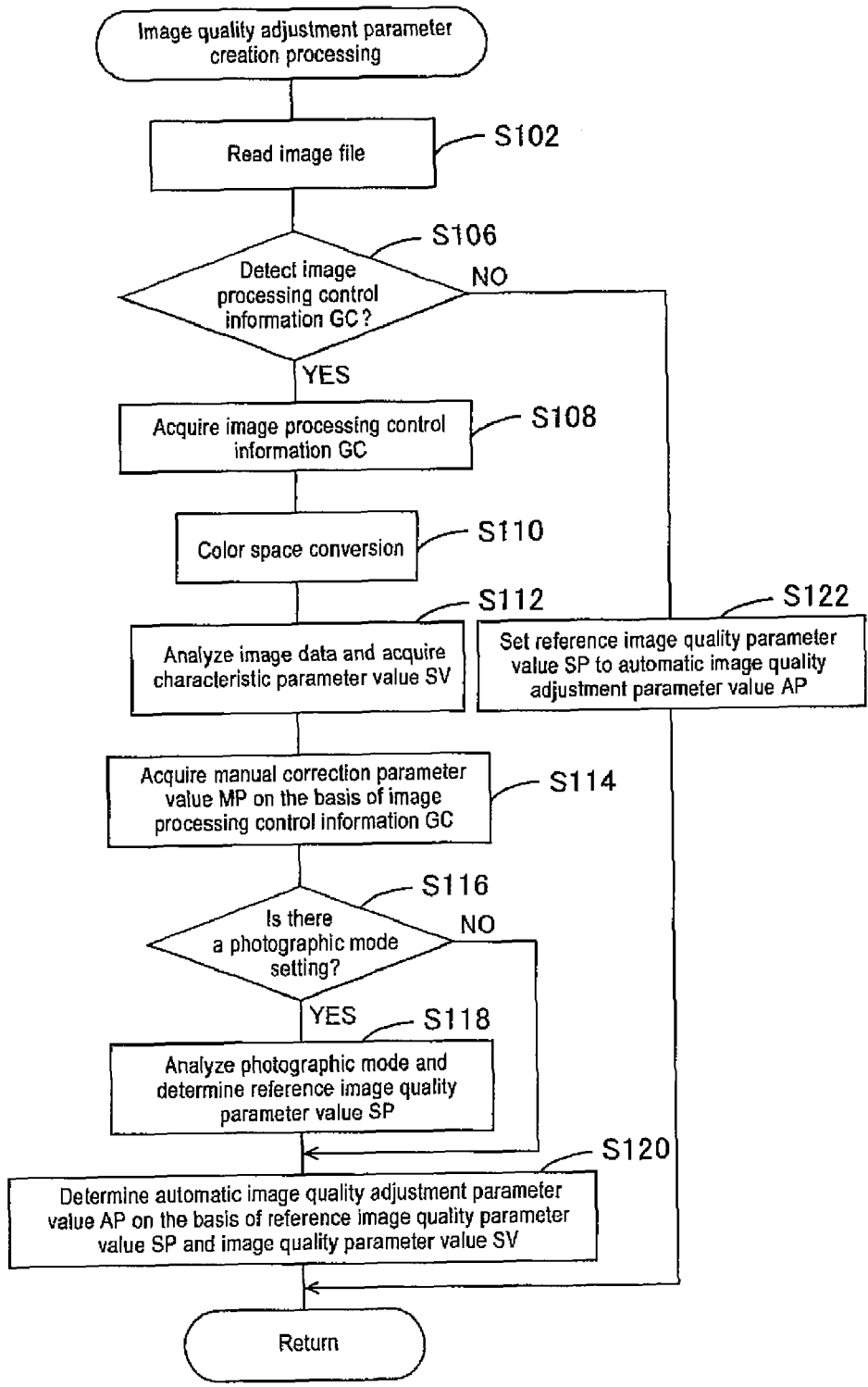
FIG. 6 is a flowchart for image quality adjustment parameter creation processing.

FIG. 6 is a flowchart of image quality adjustment parameter creation processing which is executed by the APL of the printer 100. This processing is executed by the control unit 10 of the printer. Furthermore, this processing is executed when an instruction to print an image file or display same on the display panel 18 is issued by the operation panel 20 or image input device. Naturally, if the image quality adjustment parameters of the designated image file have been created, image quality adjustment processing may be performed without performing this processing.

The control unit 10 starts processing when a memory card MC is inserted in a memory card reader 400, for example. When the processing is started, the image file GF is read from the memory card MC and the read image file GF is temporarily stored in the RAM 10*b* in step S102.

Subsequently, in step S104, the control unit 10 searches for image processing control information GC which represents information during image data generation from the image processing control information storage area 102 of the read image file GF. When image processing control information is found as a result of the search, the processing moves to step S108 and the image processing control information GC at the time the image data were generated is acquired and temporarily stored in the RAM 10*b*. However, in cases where image processing control information cannot be found, the processing moves to step S122.

When step S108 is complete, step S110 is executed and the color space of the image data GD of the read image file GF is converted. That is, the image data expressed by means of an input device-dependent color space is converted to an expression using an output device-dependent color space. More specifically, the image data expressed by means of a YCbCr color space are converted to an absolute color space and the image data converted to the absolute color space are converted to an output device-dependent color space based on the source ICC profile designated by the image file GF and the destination ICC profile designated by the output device. A description is provided hereinbelow under the assumptions that an RGB color space is adopted as an output device-dependent color space and image data are converted into an RGB color space.

Subsequently, in step S112, the control unit 10 analyzes the image data GD and acquires various characteristic parameter values (image statistical values) SV which represent the characteristics of the image data GD and temporarily stores the image data GD in the RAM 10*b*.

Subsequently, in step S114, the control unit 10 acquires manual correction parameter values MP on the basis of the image processing control information GC. Parameters acquired as the manual correction parameter values MP include image processing control parameters such as the sharpness designation, the noise removal designation, the white balance, the exposure correction amount, the exposure time, the aperture, the ISO, the focal length, and the flash usage. These manual correction parameter values MP are the result of analyzing the image data GD, that is, values that are independent of the image statistical values SV and whose values are reflected by the last image quality adjustment parameter FP.

Subsequently, in step S116, the control unit 10 judges whether the acquired image processing control information GC includes a parameter value designating the photographic mode. In this embodiment, whenever the automatic image quality adjustment parameter value AP, that is, the automatic image quality adjustment amount which reflects the image statistical value SV of the image data GD is determined, the photographic mode that combines a plurality of different image processing control parameters for each photographic scene is employed. In cases where a photographic mode is designated, individual image processing control parameters defining each photographic mode are analyzed and defined on the basis of a reference number. The control unit 10 moves to step S118 in cases where it is judged that a photographic mode designation has been made. However, in cases where the control unit 10 judges that a photographic mode designation has not been made, that is, where the photographic mode parameter is set at 0, the control unit 10 moves to step S120. The manual correction parameter values MP can be designated in parallel even in cases where the photographic mode has been set, as described earlier.

In step S118, the control unit 10 acquires each of the image processing control parameters defining the photographic mode by analyzing the photographic modes on the basis of the designated reference number and determines reference image quality parameter values SP by means of a procedure described subsequently before moving on to step S120.

Combinations of each of the image processing control parameters defining the photographic mode and combinations of numerical values designating the photographic mode are as shown in FIG. 7. FIG. 7 is an explanatory diagram showing an example of combinations of numerical values which designate photographic modes and image quality parameters. Terms such as the contrast and brightness for each of the photographic modes indicate, in a readily comprehensible manner, the image quality states obtained as a result of the image quality automatic adjustment and the image quality states designated by each term are analyzed by the control unit 10 and, in order to implement the designated image quality states, single or plural image processing control parameter values are set for each term. Photographic mode 1 is suited to standard photographic conditions, for example. Photographic mode 2 is suited to photographic conditions for photographing people, for example. Photographic mode 3 is suited to photographic conditions for photographing scenery, for example. Photographic mode 4 is suited to photographic conditions for photographing evening scenes, for example. Photographic mode 5 is suited to photographic conditions for photographing night scenes, for example. Photographic mode 6 is suited to photographic conditions for photographing flowers, for example. Photographic mode 7 is suited to photographic conditions for macro photography, for example. Photographic mode 8 is suited to photographic conditions for photographing people playing sports, for example. Photographic mode 9 is suited to photographic conditions under a backlight, for example. Photographic mode 10 is suited to photographic conditions for photographing autumn leaves, for example. Photographic mode 11 is suited to photographic conditions for commemorative photography, for example. In cases where the photographic mode has not been set, the parameter indicating the set photographic mode is set at 0.

In step S120, the image processing control parameters that have been individually set are reflected in the image quality adjustment processing. The control unit 10 modifies (corrects) the reference values set for each parameter while reflecting the values of the acquired image processing control parameters. The reference values set for each parameter are values which assume image data generated under general image generation conditions. Hence, in order to implement automatic image quality adjustment that correctly reflects the intentions of the photographer (the party generating the image), the photographer modifies the reference values by considering the individual image processing control conditions for the image processing control conditions that can be optionally set by the photographer in particular. The reference values are parameter index values which optimize the image output result which is predetermined by the image evaluation using quantitative analysis and sensitivity analysis.

For example, in cases where the photographic mode parameter is set at 2, the brightness reference value is changed from a standard value 128 to a moderately bright value 144 and the saturation reference value is changed from the standard value 128 to a moderately weak value 102 and the sharpness reference value is changed from a standard value 200 to a weak value 150. Furthermore, the contrast correction coefficient is changed from a standard value 5 to a moderately soft value 2 and the color balance correction coefficient is held at the standard value 5.

A change in each reference value and each coefficient is realized by increasing or reducing the numerical values for each reference value and each coefficient or by increasing or reducing each reference value and each coefficient in a predetermined proportion, for example. Alternatively, for example, 144 may be prepared as the moderately bright value for the brightness reference value and 112 may be prepared as the default value for the moderately dark value. Reference values may also be switched in accordance with the inclination of the correction such as moderately bright or moderately dark correction.

The control unit 10 determines the deviation from the reference image quality parameter values SP and image quality parameter values SV corrected in this manner and determines the deviation for the automatic image quality adjustment parameter value AP. For example, in a case where the image quality parameter values SV are the brightness 160 and sharpness 155, the automatic image quality adjustment parameter value AP=160−144=16 for brightness and the automatic image quality adjustment parameter value AP=155−150=5 for the sharpness.

As shown in FIG. 8, the control unit 10 executes automatic image quality adjustment by determining a last image quality adjustment parameter FP (image data correction amount) =AP+MP from the determined automatic image quality adjustment parameter value AP and the acquired manual correction parameter values MP and reflecting the last image quality adjustment parameter FP. FIG. 8 is an explanatory diagram showing illustrative values for each of the parameters AP, MP, FP, and FP' for the brightness and sharpness.

Figure 9:
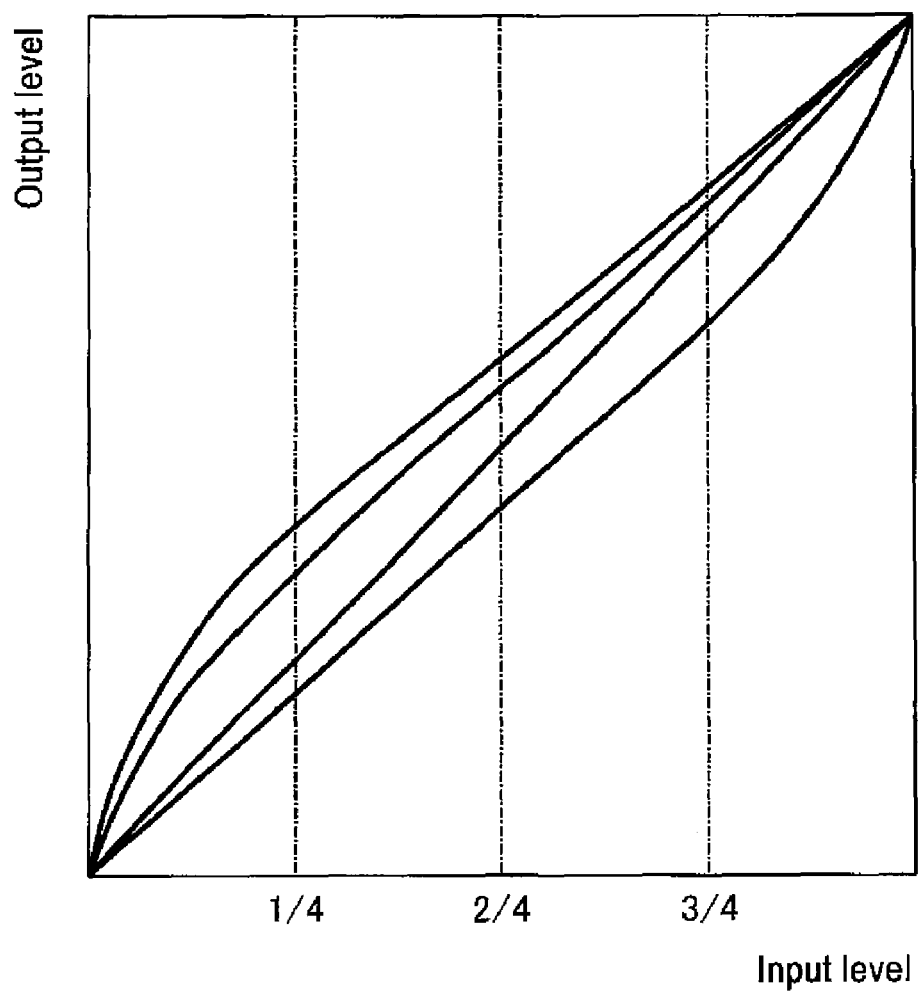
FIG. 9 is an explanatory diagram exemplifying tone curves that have been modified to reflect the last image quality adjustment parameter FP.

For example, in cases where the brightness+10 and sharpness−10 are set as the manual correction parameter values MP, the last image quality adjustment parameter FP=16+10=26 for the brightness and the last image quality adjustment parameter FP=5−10=−5 for the sharpness. The control unit 10 executes image quality adjustment for each of the image quality parameters for shadows, highlights, brightness, contrast, color balance, and stored color correction by using a tone curve (S curve) which associates the input and output levels of the RGB components of the image data GD shown in FIG. 9. FIG. 9 is an explanatory diagram exemplifying tone curves that have been modified to reflect the last image quality adjustment parameter FP. In cases where the image quality is adjusted by using tone curves, each of the FP for each of the image quality parameters are reflected and the respective single tone curves for each of the RGB components are changed. Finally, each of the tone curves corresponding with each of the modified RGB components are used to perform input/output conversion on each of the RGB components of the image data GD. As a result, image quality-adjusted image data GD are obtained.

The image-quality automatic adjustment processing for each of the image quality parameters is executed specifically as described hereinbelow, for example.

Where the contrast, shadows, and highlights are concerned, shadow points and highlight points are detected from the image data reference value-based level correction is executed, and histogram expansion is performed. Furthermore, correction of the reference value-based tone curves is executed on the basis of luminance standard deviation.

Where the brightness is concerned, it is judged whether the image is dark (inadequate exposure) or bright (overexposure) based on the luminance values calculated from the individual areas produced by dividing the image data into fourteen parts and correction of the reference value-based tone curves is executed.

Where the color balance is concerned, the deviation of the color balance from each of the histograms of the R, G, and B components of the image data is analyzed and each of the tone curves of the R, G, and B components are corrected based on reference values for each of the RGB components to reduce color seepage. In cases where the photographic mode has been set to 4 or 5, even when color seepage occurs, because this constitutes intentional color seepage, automatic adjustment of the color balance is not executed and image quality correction that reflects the intentions of the user is executed.

Where saturation is concerned, the saturation distribution of the image data is analyzed and reference value-based saturation emphasis is executed. Hence, the level of the saturation emphasis increases as the saturation level of image data increases.

Where stored colors are concerned, generally, the relevant picture layers are extracted from the image data for 'yellowish beige', 'green', 'sky blue', 'sunset red', or the like, which are called the stored colors, and correction to provide colors thought to be preferable is executed.

Where the sharpness is concerned, the frequency and the edge strength distribution of the image data are analyzed and correction is executed by performing a reference value-based 'sharpness removal' mask. The reference value is determined on the basis of the frequency distribution, where the higher the frequency of the image data (scenery or the like), the smaller the reference value and the lower the frequency of the image data (people or the like), the greater the reference value. In addition, the amount the sharpness removal mask is applied depends on the edge strength distribution, meaning that the more blurred the characteristic of the image data, the more the sharpness removal mask is applied.

Noise removal is executed by reducing the color noise by allowing a smoothing filter to act on the color difference component CbCr of YCbCr.

The image processing control parameters also include the level of application of the last image quality adjustment parameter FP, that is, a level designation parameter LP that designates the extent to which the image data GD approach the reference value-based image data. The level designation parameter LP is used such that FP'=AP* (LP/5)+MP, for example, only being reflected in the automatic correction parameter value AP and not reflected in the manual correction parameter value MP. Hence, for example, in a case where LP=10, the value of the automatic image quality adjustment parameter value AP is a multiple of two of LP and, in a case where LP=5, the value of the automatic image quality adjustment parameter value AP is a single multiple of LP, as shown in FIG. 8. The tone curves are changed on the basis of FP' and, in cases where LP=10, the amount the tone curves are changed is a multiple of two. In addition, the reference values are not changed. Only levels approaching the reference value may be changed based on the image processing control information GC.

Image quality automatic adjustment processing which reflects image processing control parameters corresponding with operating (photography) conditions of the DSC12 such as the photometric system, lens focal length, and the presence or absence of a flash will be described next.

Although the brightness of the whole screen is calculated to acquire the proper exposure in a general photometric system, in spot photometry, partial brightness of the screen is metered and the exposure is determined so that the metered area is correct. That is, in cases where the image processing control parameters of the photometry system represent spot photometry, multi-spot photometry, and partial photometry, because the intention is to afford a specified area of the screen the proper exposure, image quality adjustment processing in which the intentions of the user are not reflected is executed when the brightness is adjusted automatically. Automatic adjustment of the brightness is not executed in these three photometry modes.

The threshold value for the sharpness is changed on the basis of the lens focal length and F number during photography. Generally, 'blur' is determined from the lens focal length and the F number (aperture). Hence, when the sharpness is automatically adjusted, image quality adjustment processing which reflects the blur assumed during photography can be executed by associating the threshold value corresponding with the sharpness with the lens focal length and the F number.

For example, in the case of F13 (large aperture) with a wide angle lens (no more than 35 mm), it can generally be judged that the photographer intends to perform photography to generate a sharp image with the focus extending over the whole screen from the foreground to the background in scenery photography or commemorative photography. Hence, in such a case, image quality adjustment is executed by reducing the sharpness threshold value to provide a greater number of pixels with the sharpness effect and by increasing the amount of sharpness applied to create a sharper image.

However, in the case of F2 (open aperture) with a telephoto lens (100 mm or more), it can generally be judged that the photographer intends to blur the background so that the object stands out for a portrait or the like. Hence, in this case, image quality adjustment processing is executed by increasing the sharpness threshold value so that smooth areas such as skin are not provided with the sharpness effect and only pixels at the boundary between the background and the object are provided with the sharpness effect and by reducing the amount of sharpness applied to roughen the skin or the like.

Figure 10:
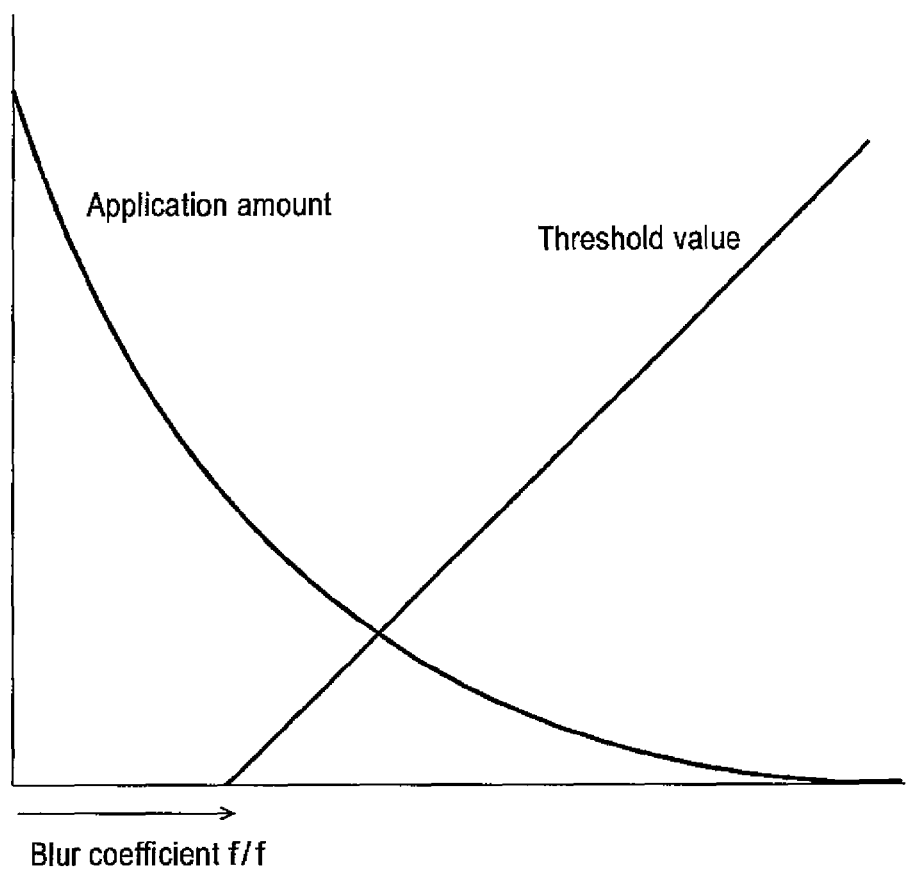
FIG. 10 is an explanatory diagram illustrating a blur index f/F that is determined from the lens focal length f (mm) and F number.

When the blur index determined from the lens focal length f (mm) and the F number is defined as f/F, the relationship shown in FIG. 10 is valid. FIG. 10 is an explanatory diagram illustrating the blur index f/F determined from the lens focal length f (mm) and the F number.

The strength of the noise removal is changed based on the existence of a flash during photography. Generally, in the case of an image which is photographed using a flash, noise whereby the image is blown out to white (overexposed) at close range readily occurs. Hence, noise removal is more strongly applied in the case of an image which is photographed using a flash than for an image that is photographed without using a flash. For example, blowout is enhanced by increasing the size of the noise removal median filter. Naturally, an embodiment that extracts pixels one line at a time to reduce the reference pixel count while securing a large filter application area can also be adopted.

D-b. Image Quality Adjustment Processing

Figure 11:
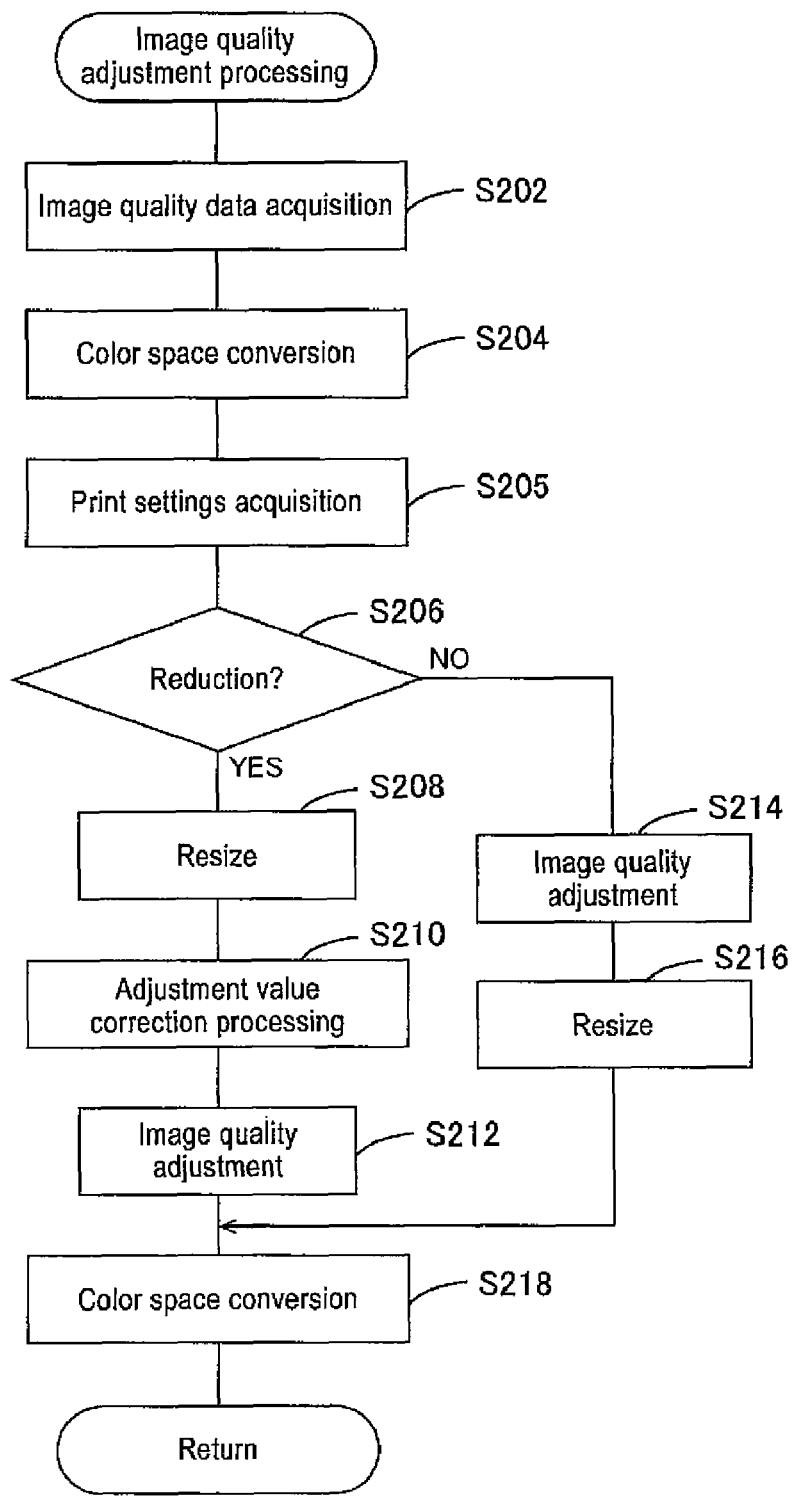
FIG. 11 is a flowchart of image quality adjustment processing.

FIG. 11 is a flowchart of image quality adjustment processing which the printer executes in accordance with F/W. This processing is performed after the end of the image quality adjustment parameter creation processing.

In step S202, the image file GF is read from the memory card MC and the read image file GF is temporarily stored in the RAM 10b.

Subsequently, in step S204, the color space of the image data GD of the read image file GF is converted. That is, the image data expressed by an input device-dependent color space is converted to an expression using an output device-dependent color space. More specifically, the image data expressed by means of a YCbCr color space are converted to an absolute color space and the image data converted to the absolute color space are converted to an output device-dependent color space based on the source ICC profile designated by the image file GF and the destination ICC profile designated by the output device. A description is provided hereinbelow under the assumptions that an RGB color space is adopted as an output device-dependent color space and image data are converted into an RGB color space.

In step S205, print settings PP are acquired. Print settings can be designated in cases where the user makes a print request from an external input device and when a print command is issued using an operation panel. The control unit 10 acquires print settings designated by the user. In cases where there is no print setting designation when a print request or operation input or the like is made, the control unit 10 acquires default print settings which are saved beforehand in the involatile memory 14 or the like. The print settings PP include information such as the media size (paper size or the like), the media type (paper type or the like), the print layout (lay-out printing, margins, size, and so forth), and the resolution. The image size required for printing is, that is, the print size, is determined from this information.

For example, when the paper size is designated, the standard paper size is determined from the paper size (width: w (inches)×height: h (inches)). The pixel count constituting the print size is determined from the print size and the resolution (R (dpi)) (width: w×R, height h×R). Size adjustment is possible when pixel count conversion to match the pixel count of the determined print size and the pixel count of the original image is performed. In resize processing, size adjustment is carried out in accordance with thinning processing and interpolation processing or the like by making the target the number of pixels constituting the print data PD predicted from the print settings.

However, in cases where a print layout is designated, the print size is changed from the standard size. For example, when the margins have been designated, an area found by subtracting the margin area from the paper size is the print size. In cases where a size is designated, the designated size is the print size, irrespective of the paper size. In cases where multiple same-page printing is designated, the paper size is divided into equal parts by the number of prints and an area found by subtracting the margins from each of the divided areas is the print size. Thus, in cases where the print layout is designated, the pixel count constituting the print data PD is determined on the basis of the modified print size.

In addition, in cases where paper that smudges very little in comparison with ordinary paper, such as photograph paper or matt paper, is used, the resolution is generally made higher than that of ordinary paper. Hence, it is also necessary to consider the media type in the calculation of the pixel count required for the print data PD and the pixel count is calculated on the basis of resolutions associated with each of the media types.

Subsequently, in step S206, it is judged whether resizing (enlargement and reduction) of the image data GD is required each time printing is performed. In cases where the image data GD is reduced, the speed of the processing is increased by reducing the processing amount of the image quality adjustment processing by performing image quality adjustment processing on resized image data GD'. However, in cases where the image data GD is enlarged and in cases where there is no resizing, image quality adjustment processing is executed for the image data GD prior to resizing. In this embodiment, this judgment is made based on whether there is a reduction in particular.

More specifically, the judgment is performed by means of a comparison between the pixel count S1 of the image data designated for printing and the pixel count S2 of the print data PD determined in step S10. If S1>S2, it is judged that there is to be a reduction and the processing moves to step S14. If S1≦S2, it is judged that there is to be an enlargement or that there is no size adjustment and the processing moves to processing S20. As a result of this judgment, in cases where the image data GD are reduced, image quality adjustment processing is performed by means of the following processing on the size-adjusted image data GD'. However, in cases where the image data GD are enlarged, corrected image data are size-adjusted after performing image quality adjustment processing on pre-size adjustment image data GD, by means of the following processing.

In step S14, the size adjustment unit reduces the image data GD. A reduction involves thinning the data by a fixed percentage or converting the pixel count of the image data GD to a pixel count that conforms to the print size and resolution. Naturally, whenever thinning is performed, an interpolation calculation (the neighborhood method, bilinear interpolation, or bicubic interpolation) may also be suitably performed. As a result, the data amount (pixel count) of the image data GD' decreases to an amount below that of the original image data. Because the data amount of the image data decreases, the processing amount of the image quality adjustment processing decreases and the processing speed increases.

Subsequently, in steps S16 and S18, the image quality adjustment unit M6 executes correction processing on the size-adjusted image data GD'. The image quality adjustment unit M6 first acquires the image quality adjustment parameters created in pre-processing in step S16 and makes corrections conforming to the size adjustment of step S14 on the image quality adjustment parameters. A description of the correction of the image quality adjustment parameters which accompanies the size adjustment of the image data will be provided hereinbelow by taking 'sharpness adjustment' in particular among the image quality adjustments as an example.

In the case of 'sharpness adjustment', sharpness emphasis processing or blur processing is carried out by taking the definition of the image as the adjustment target. Sharpness emphasis can be performed by adding the difference between a blurred image using a Gaussian function and an original image, for example, to the original image. Naturally, a convolution mask that is created beforehand by means of Equations (1) and (2) below may also be used:

Equation 1

$$S(x,y)=f(x,y)+(G(x,y)-F(x,y))\times ST \quad (1)$$

(where $|G(x,y)-f(x,y)|\times ST \geqq TH$)

Equation 2

$$S(x,y)=f(x,y) \quad (2)$$

(where $|G(x,y)-f(x,y)|\times ST < TH$)

Here, f(x,y) is a grayscale value for each color component when the position of a pixel is specified using coordinates (x,y) and S(x,y) is a grayscale value after sharpness emphasis. G(x,y) is the result of applying Gaussian blur to the grayscale value f(x,y), ST is the strength of the sharpness emphasis, and TH is the threshold value of the sharpness emphasis. That is, if the product of the size of the differential between the grayscale value G (x,y) after applying Gaussian blur and the original grayscale value f(x,y) and the strength ST is equal to or more than the predetermined threshold value TH, sharpness emphasis is performed and, if the strength ST is smaller than the threshold value TH, sharpness emphasis is not carried out.

The grayscale value G (x,y) after applying Gaussian blur is calculated by Equation (3) below:

Equation 3

$$\left.\begin{array}{l} F(x, y) = \dfrac{1}{2\pi\sigma} e^{-\frac{x^2+y^2}{2\sigma^2}} \\ G(x, y) = \sum_r f(x, y) \cdot F(x, y) \end{array}\right\} \quad (3)$$

Here, r indicates the blur application range and a radius centered on a position (x,y) is specified by the pixel count. As was mentioned hereinabove, a blurred image can be obtained by performing processing in the application range r to combine a formula F(x,y), which represents the Gaussian distribution, and the image grayscale value f(x,y) through multiplication. Naturally, the right hand side of G(x,y) of Equation (3) can also be multiplied by a standardized constant.

As mentioned earlier, sharpness adjustment is image quality adjustment of convolution of the influence of peripheral pixels contained within a predetermined radius of the pixels of interest (a predetermined range in the case of a filter), with the convolution being applied to the pixels of interest. Hence, when the sharpness adjustment parameter of the original image is applied to a reduced image, the effect of the image quality adjustment is different. Therefore, in step S16, a parameter P2 is created by suitably correcting a parameter P1 of the original image. The parameter P2 is created so that, in cases where the parameter P2 is applied to the reduced image, the same image quality adjustment results as that for a case where the parameter P1 is applied to the original image is obtained. In other words, the parameter P2 is created so that the level of the discrepancy between the sharpness effect appearing in an image obtained by reducing the original image after applying the parameter P1 and the sharpness effect appearing in the image obtained by applying the parameter P2 to the image following reduction of the original image lies at a predetermined level.

In the sharpness adjustment, blurred-image pixel data are added only to pixels for which the blurred-image pixel data ((G(x,y)-F(x,y)×ST) exceed a threshold value TH as mentioned earlier. The two relations below were established empirically between each of the sharpness adjustment strengths for the application amount ST, threshold value TH, processing radius (blur radius) r, and processing target size (image size) S of each of the sharpness adjustment parameters:

Equation 4

$$ST \times r \propto S \quad (4)$$

$$TH \times r \propto S \quad (5)$$

Based on this rule of thumb, it is clear that correction of the sharpness effect, which is performed in accordance with modification of the processing target size, is implemented by way of correction such that the application amount ST and the threshold value TH are substantially proportional to fluctuations in the processing target size (resize amount) while the processing radius is fixed.

In other words, a relational equation between the application amount ST of the original image and an application amount ST' of the reduced image is established as follows:

Equation 5

$$ST' = \alpha \times ST \quad (6)$$

(where α is a value proportional to the fluctuation of the processing target size S)
and a relational equation between the threshold value TH of the original image and a threshold value TH' of the reduced image is established as follows:

Equation 6

$$TH' = \alpha \times TH \quad (7)$$

α corresponds to size contrast information. Naturally, correction may also be performed such that the application amount ST and threshold value TH are fixed and the processing radius r is substantially proportional to the fluctuations in the processing target size and correction may be performed such that ST×r and TH×r are substantially proportional to the fluctuations in the processing target size.

The present inventor performed calculations for three examples of α in relational equations (6) and (7). FIG. 12 is the result of these calculations. FIG. 12 shows the respective values resulting from calculations of the size ratio β, size ratio square root α, and approximation y when an image of a Base (2000 pixels×1500 pixels) size is converted into each size from QVGA (320 pixels×240 pixels) to 500 M (25600 pixels×19200 pixels). Here, β, α, and y are defined by the following equations respectively:

Equation 7

$$\alpha = \sqrt{\frac{s}{s_0}}$$

$$\beta = \frac{s}{s_0}$$

$$y = b \times \left(1 - \frac{1}{a \times \beta + 1}\right)$$

(where s=(image size after resizing), $s_0$=(original image size)

In FIG. 12, the size ratio β is rounded off when the reduction ratio increases as is the case when resizing from Base to QVGA. When the expansion ratio increases as is the case when resizing from Base to 120 M or 500 M, the digits are too large for use in the adjustment of the sharpness parameter. The square root of the size ratio is suitable without rounding off at the smallest resolution. However, the digits are still too large when the enlargement ratio is large as is the case when resizing from Base to 500 M. The approximation y lies within a suitable range for sharpness parameter adjustment and is a small value for QVGA and VGA.

Therefore, according to this embodiment, the approximation and square root of the processing target size ratio are combined, with the square root of the processing target size ratio being applied to Base and smaller image sizes and the approximation being applied to image sizes exceeding Base. It goes without saying that the size ratio β, size ratio square root α, and approximation y can each be used for resolution conversion within the proper ranges.

Subsequently, in step S18, the reduced image data are corrected by using the sharpness adjustment value that was corrected in step S16. A sharpness effect which is the same as the sharpness effect assumed for original image data is executed for resized image data. When step S18 is complete, the processing moves to the print processing of step S24.

Meanwhile, when the processing moves to step S20, image quality adjustment based on the image quality adjustment parameters is performed on the original image. In this step, because image quality adjustment which is created by assuming the original image is performed on the original image, the image quality adjustment parameters created by the image quality adjustment processing are used as is.

Subsequently, in step S22, resize processing of the image data that underwent image quality adjustment in step S20 is performed. When step S22 is complete, the processing moves to the print processing of step S24.

In step S24, print processing is executed on the basis of the image data created in step S18 or S22. First, the color conversion processing and halftone processing for printing are executed. In the color conversion processing, the control unit 10 references a lookup table (LUT) for conversion to a CMYK color space which corresponds with the RGB color space stored in the ROM 31 and converts the image data color space from the RGE color space into the CMYK color space. That is, image data comprising the R, G, and B grayscale values are converted into data of the grayscale values of each of the six colors C, M, Y, K, LC, and LM, for example, which are utilized by printer 100.

In halftone processing, color-converted image data are received and gradation conversion processing is performed. In this embodiment, the color-converted image data are expressed as data with a range of 256 grayscales for each color. In contrast, the printer 100 of this embodiment only adopts either a 'dot-forming' state or a 'non-dot-forming' state and the printer 100 of this embodiment is only able to obtain two localized grayscales. Therefore, image data having 256 grayscales are converted into image data expressed by two grayscales which can be expressed by the printer 100. Methods which are representative of this two grayscale conversion (binarization) processing include the method known as 'random dither' and the method called 'systematic dither'.

In cases where the resolution of the image data is lower than the print resolution, the printer 100 generates new data between adjacent image data by performing linear interpolation prior to the color conversion processing and, conversely, in cases where the resolution of the image data is higher than the print resolution, the printer 100 executes resolution conversion processing to convert the image data resolution into the print resolution by thinning the data at a fixed percentage. Furthermore, the printer 100 executes interlace processing to rearrange image data which have been converted to a format representing the existence of dot formation in the order in which the image data should be transferred to the printer 100.

E. Modified Example

Although implementation using a standalone printer was mentioned in the above embodiment, all or part of the image processing may also be executed on a computer and on a server via a network. In this case, all or some of the functions of the image processing shown in FIG. 5 are realized by providing an image data processing application such as a retouch application or printer driver installed on the hard disk or the like of the computer with these functions.

Although the above embodiment mentioned image input devices such as a scanner and memory card reader as being separate from the printer, a multifunction printer in which the image input devices are integrated may also be used as the printer.

The present invention is not limited to the above embodiment and modified example and also includes constitutions obtained by switching each of the constitutions disclosed in the above embodiment and modified example and by changing combinations thereof, as well as constitutions obtained by switching each of the constitutions disclosed by commonly known technologies as well as in the above embodiment and modified example and by changing combinations thereof.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. An image processing device, which performs, on image data, image quality adjustment processing and resize processing to adjust an image size to a target size, and which outputs processed image data, comprising:
    an adjustment parameter creation unit which creates adjustment parameters for the image quality adjustment processing, on the basis of original image data;
    a contrast information creation unit which acquires the image size of the original image data and the target size, and creates size contrast information;
    a resize amount detection unit which determines a resize amount in the resize processing on the basis of the size contrast information; and
    an adjustment parameter modification unit which modifies the adjustment parameters in accordance with the resize amount, wherein
    in cases where the image size in the size contrast information is equal to or greater than the target size, the adjustment parameter modification unit modifies the adjustment parameters and the image quality adjustment processing is performed on image data that has been resized in the resizing processing, and
    in cases where the image size in the size contrast information is smaller than the target size, the adjustment parameter modification unit does not modify the adjustment parameters and the resize processing is executed for image data that have been quality-adjusted in the image quality adjustment processing.

2. The image processing device according to claim 1, wherein the adjustment parameter modification unit modifies the adjustment parameters in accordance with the resize amount so that a difference between adjustment effect for the original image data and adjustment effect for the resized image data of the adjustment parameters is small.

3. The image processing device according to claim 1, wherein the image quality adjustment processing is performed on image data of a small size either prior to or after the resize processing.

4. The image processing device according to claim 1, wherein the image quality adjustment processing is image quality adjustment for convolution of the influence of peripheral pixels, which are contained in a predetermined range centered on pixels of interest, with the convolution being applied to the pixels of interest.

5. The image processing device according to claim 4, wherein the adjustment parameter modification unit modifies adjustment intensity of the adjustment parameters.

6. The image processing device according to claim 4, wherein the adjustment parameter modification unit modifies the adjustment intensity of the adjustment parameters by modifying the range of the peripheral pixels for convolution with the pixels of interest.

7. An image processing method of performing, on image data, image quality adjustment processing and resize processing to adjust an image size to a target size, and of outputting processed image data,
    the method comprising:
    an adjustment parameter creation step of creating adjustment parameters for the image quality adjustment processing on the basis of original image data;
    a contrast information creation step of acquiring an image size of the original image data and a target size, and creating size contrast information;
    a resize amount detection step of determining a resize amount in the resize processing on the basis of the size contrast information; and
    an adjustment parameter modification step of modifying the adjustment parameters in accordance with the resize amount, wherein
    in cases where the image size in the size contrast information is equal to or greater than the target size, the adjustment parameters are modified in the adjustment parameter modification step and the image quality adjustment processing is performed on image data that has been resized in the resizing processing, and
    in cases where the image size in the size contrast information is smaller than the target size, the adjustment parameters are not modified in the adjustment parameter modification step and the resize processing is executed for image data that have been quality-adjusted in the image quality adjustment processing.

8. A non-transitory computer-readable recording medium recorded with an image processing program which performs, on image data, image quality adjustment processing and resize processing to adjust an image size to a target size, and which outputs processed image data, the image processing program causing a computer to implement:
    an adjustment parameter creation function for creating adjustment parameters for the image quality adjustment processing on the basis of original image data;
    a contrast information creation function for acquiring an image size of the original image data and the target size, and creating size contrast information;
    a resize amount detection function for determining a resize amount in the resize processing on the basis of the size contrast information; and
    an adjustment parameter modification function for modifying the adjustment parameters in accordance with the resize amount, wherein
    in cases where the image size in the size contrast information is equal to or greater than the target size, the adjustment parameter modification function modifies the adjustment parameters and the image quality adjustment processing is performed on image data that has been resized in the resizing processing, and
    in cases where the image size in the size contrast information is smaller than the target size, the adjustment parameter modification function does not modify the adjustment parameters and the resize processing is executed for image data that have been quality-adjusted in the image quality adjustment processing.

* * * * *